(12) United States Patent
Tsai et al.

(10) Patent No.: US 8,665,521 B2
(45) Date of Patent: Mar. 4, 2014

(54) WINDOW SYSTEM AND LIGHT GUIDING FILM THEREIN

(75) Inventors: Jung-Lieh Tsai, Tainan (TW); Yi-Hsing Chiang, Tainan (TW); Pei-Chian Tsai, Tainan (TW)

(73) Assignee: Chi Lin Technology Co., Ltd., Tainan (TW)

( * ) Notice: Subject to any disclaimer, the term of this patent is extended or adjusted under 35 U.S.C. 154(b) by 125 days.

(21) Appl. No.: 13/354,685

(22) Filed: Jan. 20, 2012

(65) Prior Publication Data

US 2012/0194913 A1  Aug. 2, 2012

(30) Foreign Application Priority Data

Jan. 28, 2011  (TW) .............................. 100103475 A

(51) Int. Cl.
*G02B 17/00* (2006.01)
*G02B 27/00* (2006.01)

(52) U.S. Cl.
USPC .......................................... 359/592; 359/595

(58) Field of Classification Search
USPC ................................. 359/591, 595, 597, 592
See application file for complete search history.

(56) References Cited

U.S. PATENT DOCUMENTS

| 721,256 | A | | 2/1903 | Wadsworth | |
|---|---|---|---|---|---|
| 4,089,594 | A | | 5/1978 | Ewin | |
| 4,357,074 | A | * | 11/1982 | Nardini | ........................ 359/592 |
| 4,557,565 | A | | 12/1985 | Ruck et al. | |
| 5,123,722 | A | * | 6/1992 | Meymand | ..................... 359/592 |
| 5,295,051 | A | | 3/1994 | Cowling | |
| 5,461,496 | A | | 10/1995 | Kanada et al. | |
| 5,650,875 | A | | 7/1997 | Kanada et al. | |
| 5,880,886 | A | | 3/1999 | Milner | |
| 6,311,437 | B1 | * | 11/2001 | Lorenz | ......................... 359/592 |
| 6,367,937 | B2 | | 4/2002 | Koster | |
| 6,435,683 | B1 | | 8/2002 | Milner | |
| 6,616,285 | B2 | | 9/2003 | Milner | |
| 7,072,096 | B2 | * | 7/2006 | Holman et al. | ................ 359/298 |
| 8,107,164 | B2 | * | 1/2012 | Tsai | ............................... 359/443 |

(Continued)

FOREIGN PATENT DOCUMENTS

| CN | 97204733.6 A | 11/1998 |
|---|---|---|
| CN | 1578915 A | 2/2005 |

(Continued)

OTHER PUBLICATIONS

Office Action issued Oct. 29, 2012 from JPO for the JP Patent Application No. 2011-029964 cites WO 2008/147632 and JP 2010-527815 (which corresponds to WO 2008/147632).

(Continued)

*Primary Examiner* — Christopher Mahoney
(74) *Attorney, Agent, or Firm* — WPAT, P.C.; Anthony King; Kay Yang

(57) ABSTRACT

The present invention relates to a window and light guiding film therein. The light guiding film includes a film base and at least one microstructure. The microstructure is disposed on a side of the film base, and comprises a first surface and a second surface. The refraction index of the microstructure is 1.9 to 2.6. A first inclination angle is between the first surface and a reference plane, the reference plane is perpendicular to the film base, and a second inclination angle is between the second surface and the reference plane, wherein the first inclination angle is less than or equal to the second inclination angle.

14 Claims, 4 Drawing Sheets

(56) References Cited

U.S. PATENT DOCUMENTS

| | | | |
|---|---|---|---|
| 2005/0254130 | A1 | 11/2005 | Graf et al. |
| 2006/0215074 | A1 | 9/2006 | Jak et al. |
| 2008/0030859 | A1 | 2/2008 | Usami |
| 2008/0291541 | A1 | 11/2008 | Padiyath et al. |
| 2009/0009870 | A1 | 1/2009 | Usami |
| 2010/0134720 | A1 | 6/2010 | Choi et al. |
| 2010/0177394 | A1* | 7/2010 | Guering et al. ............... 359/592 |
| 2011/0043919 | A1* | 2/2011 | Ko et al. ...................... 359/592 |

FOREIGN PATENT DOCUMENTS

| | | |
|---|---|---|
| TW | 200931086 | 7/2009 |
| TW | M379027 | 4/2010 |
| WO | 0017477 A2 | 3/2000 |
| WO | 2003/071079 A1 | 8/2003 |

OTHER PUBLICATIONS

English translation of Office Action issued Oct. 29, 2012 from JPO for the JP Patent Application No. 2011-029964.

Office Action issued Feb. 16, 2013 for counterpart China application No. 201110052379.7 which cites US 4557565A and US2005/0254130.

English translation of Office Action issued Feb. 16, 2013 for counterpart China application No. 201110052379.7 which cites US 4557565A and US2005/0254130.

Notice of Allowance issued Oct. 16, 2012 for the TW patent application No. 099126140 (which is a counterpart application of U.S. Appl. No. 12/793,490) cites US 4557565, 2009/0009870 and TW 200931086.

English abstract of TW 200931086, Jul. 2009.

Office Action issued Nov. 27, 2012 from German Patent and TDMK Office for the DE Patent Application No. 102011000506.4 cites US 2008/0291541A, WO 03/071079A1, US 2006/0215074, and US 2010/0134720.

English translation of Office Action issued Nov. 27, 2012 from German Patent and TDMK Office for the DE Patent Application No. 102011000506.4.

English abstract of WO 03/071079A1, Aug. 2003.

Office Action issued on Apr. 30, 2013 from Japan Patent Office for the corresponding JP Patent Application No. 2011-029964.

English Translation of Office Action issued on Apr. 30, 2013 from Japan Patent Office for the corresponding JP Patent Application No. 2011-029964.

Office Action issued May 24, 2012 for the CN Patent Application No. 201010281708.0 cites CN 1578915A and US 20090009870 A1 (CN Patent Application No. 201010281708.0 issued May 24, 2012 is a counterpart of CN application of U.S. Appl. No. 12/793,490 relevant to the present application).

English Abstract of Office Action issued May 24, 2012 for the CN Patent Application No. 201010281708.0.

English Abstract CN 1578915A, Feb. 2005.

* cited by examiner

WINDOW SYSTEM AND LIGHT GUIDING FILM THEREIN

BACKGROUND OF THE INVENTION

1. Field of the Invention

The present invention relates to a window system and light guiding film therein, and more particularly to a window system and light guiding film capable of changing the direction of incident light.

2. Description of the Related Art

The conventional sunlight guiding apparatus is of various types, such as plate, shutter or film, which is disposed on or near a window of a room and used for guiding sunlight beams into the room. The sunlight beams are directed to illuminate a reflector on the ceiling in the room. The sunlight beams are then reflected by the reflector, and used for indoor lighting or auxiliary illumination. In some conventional sunlight guiding apparatus, the sunlight beams are guided into the room directly without being reflected by the reflector on the ceiling.

The conventional sunlight guiding apparatus can guide the direct light beams and the diffused light beams of the sunlight to the reflector on the ceiling by retraction and/or reflection, so as to illuminate the interior of the room uniformly and reduce discomfort from glare. Further, the use of the conventional sunlight guiding apparatus can save energy required by daytime use of electric lighting equipment.

The drawback suffered by conventional sunlight guiding apparatus is described as follows. Most of the sunlight beams cannot be directed to the ceiling; that is, most of the sunlight beams cannot be reflected by the reflector in order to effectively resolve the problem of glare. Thus, the illumination effect is not ideal.

Therefore, it is necessary to provide a window system and light guiding film therein to solve the above problems.

SUMMARY OF THE INVENTION

The present invention is directed to a light guiding film, which comprises a film base and at least one microstructure. The film base has a first side and a second side is opposite the first side. The microstructure is disposed on the second side of the film base, and the refraction index of the microstructure is 1.9 to 2.6. The microstructure has a first surface and a second surface above the first surface, wherein a first inclination angle is between the first surface and a reference plane, the reference plane is perpendicular to the film base, a second inclination angle is between the second surface and the reference plane. The value of the first inclination angle is less than or equal to the value of the second inclination angle.

The light guiding film can thus guide the incident light beams into a room nearly horizontally and avoid glare. In addition, the light guiding film is relatively simple to manufacture.

The present invention is further directed to a window system, which comprises a first plate, a second plate and a light guiding film. The second plate is fixed to the first plate. The light guiding film is the same as the above-mentioned light guiding film, and is disposed in an accommodating space between the first plate and the second plate. The light guiding film is attached to the first plate, and comprises a film base and at least one microstructure.

DETAILED DESCRIPTION OF THE INVENTION

Figure 1:
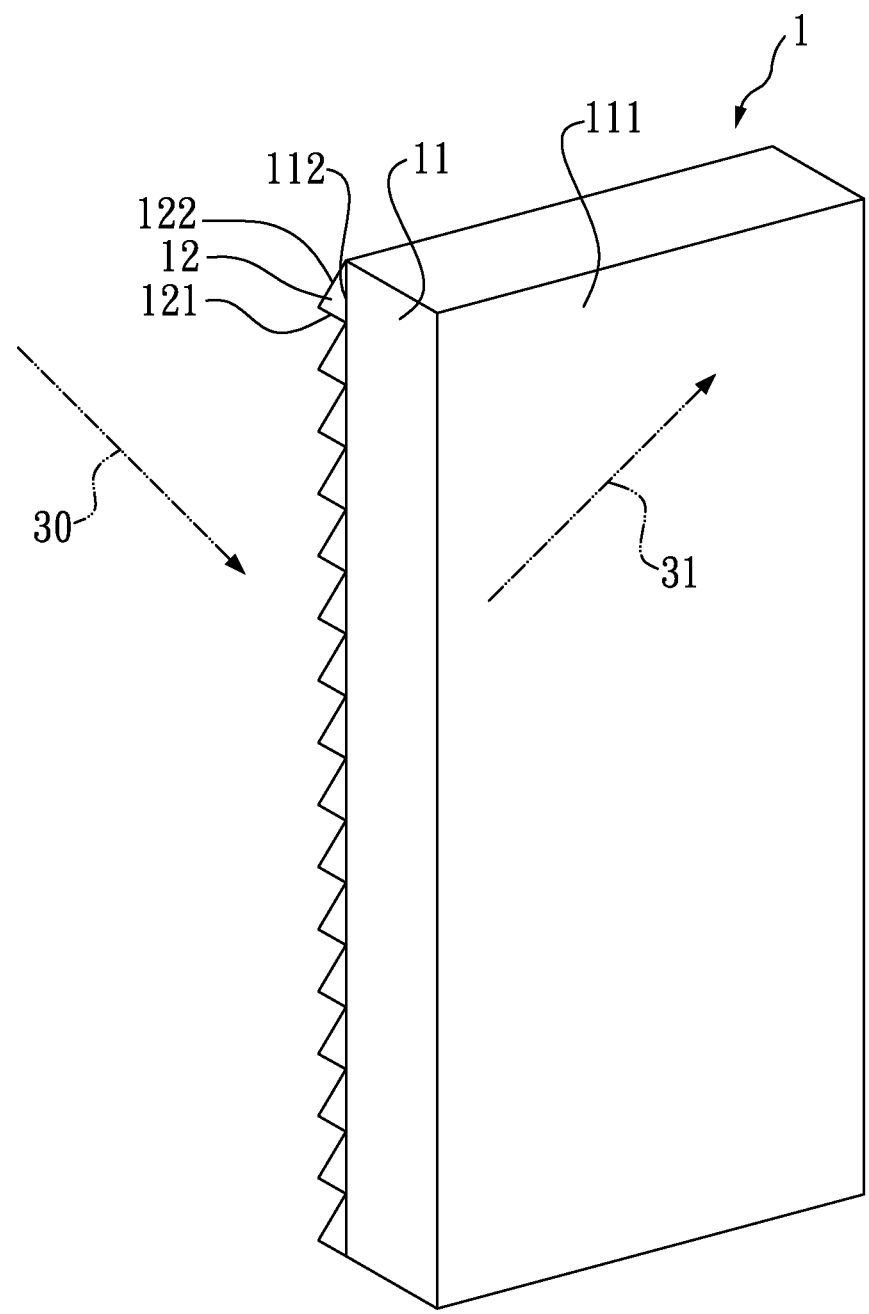
FIG. 1 is a perspective view of a light guiding film according to an embodiment of the present invention.
Figure 2:
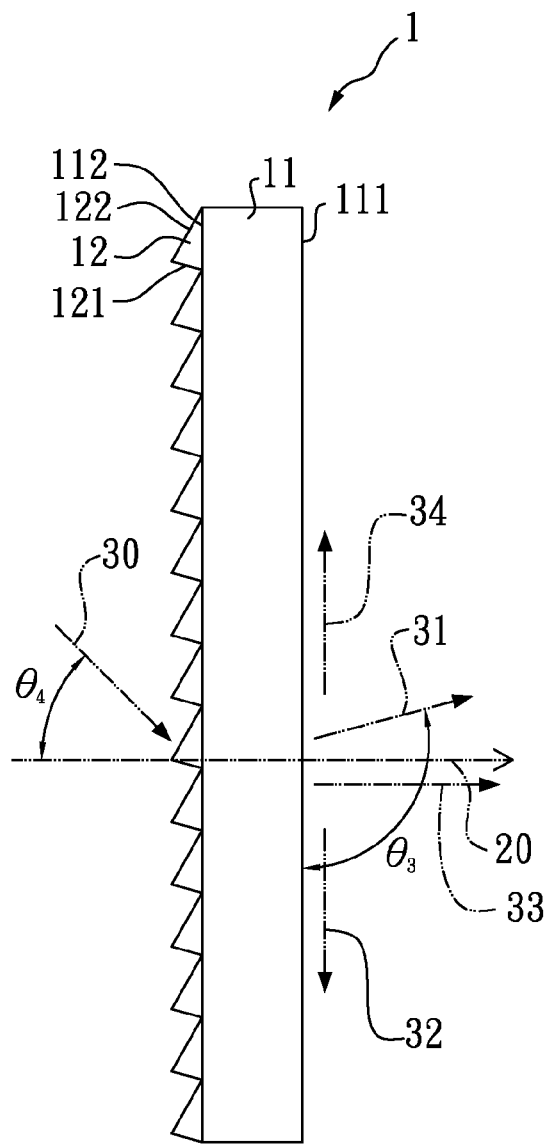
FIG. 2 is a side view of the light guiding film of FIG. 1.
Figure 3:
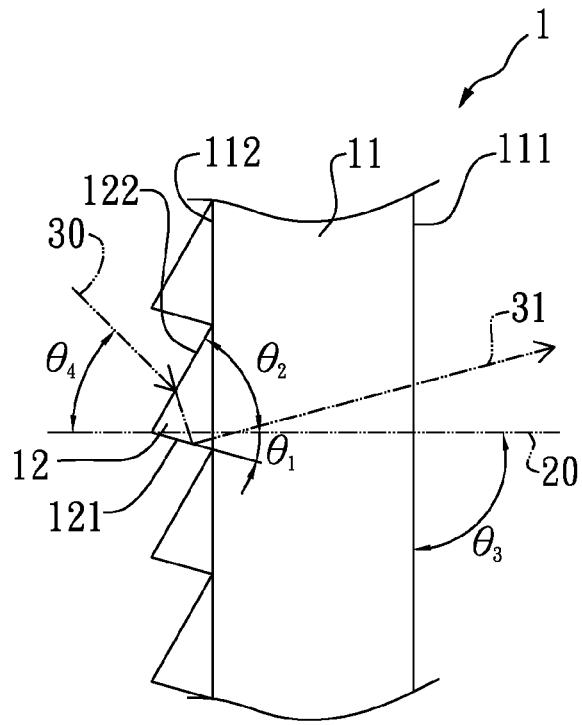
FIG. 3 is a partially enlarged view of FIG. 2.

FIG. 1 shows a perspective view of a light guiding film according to an embodiment of the present invention. FIG. 2 shows a side view of the light guiding film of FIG. 1. FIG. 3 shows a partially enlarged view of FIG. 2. The light guiding film 1 comprises a film base 11 and at least one microstructure 12. In the embodiment, the light guiding film 1 comprises a plurality of microstructures 12. The film base 11 has a first side 111 and a second side 112, and the second side 112 is opposite the first side 111.

The microstructure 12 is disposed on the second side 112 of the film base 11, and comprises a first surface 121 and a second surface 122. The second surface 122 is above the first surface 121. A reference plane 20 is defined as a phantom plane that is perpendicular to the first side 111 or the second side 112 of the film base 11. That is, when the light guiding film 1 stands upright, the reference plane 20 is a phantom horizontal plane. A first inclination angle $\theta_1$ is between the first surface 121 and the reference plane 20. A second inclination angle $\theta_2$ is between the second surface 122 and the reference plane 20. The value of the first inclination $\theta_1$ angle is less than or equal to the value of the second inclination angle $\theta_2$.

As shown in FIG. 3, in this embodiment, the value of the first inclination angle $\theta_1$ is between 11 to 19 degrees, and the value of the second inclination angle $\theta_2$ is between 52 to 68 degrees, and the sum of the value of the first inclination angle $\theta_1$ and the value of the second inclination angle $\theta_2$ is between 63 to 87 degrees. Preferably, the value of the first inclination angle $\theta_1$ is between 13 to 17 degrees, and the value of the second inclination angle $\theta_2$ is between 58 to 66 degrees. More preferably, the first inclination angle $\theta_1$ is 15 degrees, and the second inclination angle $\theta_2$ is 60 degrees.

Figure 4:
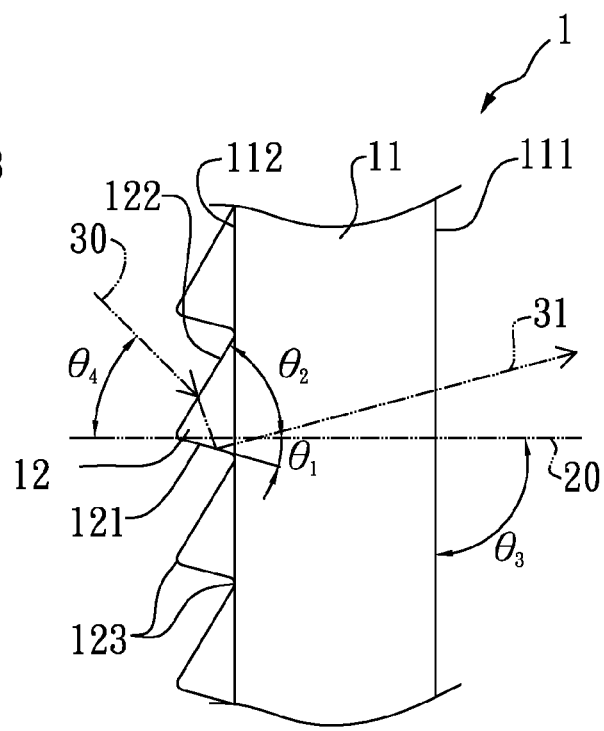
FIG. 4 is another type of the light guiding film of the embodiment of the present invention.

In this embodiment, the cross section of the microstructure 12 is substantially triangular, and the first surface 121 intersects the second surface 122. However, the microstructure 12 may further comprises a curved chamfer 123, as shown in FIG. 4. The curved chamfer 123 is disposed between the first surface 121 and the second surface 122, and adjacent to the first surface 121 and the second surface 122.

The material of the film base 11 may be different form that of the microstructure 12. The film base 11 is made of light transmissible material, such as polymethyl methacrylate (PMMA), arcylic-based polymer, polycarbonate (PC), polyethylene terephthalate (PET), polystyrene (PS) or a copolymer thereof, with a refraction index of 1.35 to 1.65.

The microstructure 12 is made of light transmissible metal oxide, such as $TiO_2$ or $Ta_2O_5$, with a refraction index of 1.9 to 2.6. In one embodiment, a layer of the metal oxide is formed on the film base 11, then the metal oxide is etched to form the microstructure 12. It is to be understood that the material of the film base 11 may be the same as that of the microstructure 12, which is all metal oxide.

In this embodiment, a plurality of incident light beams 30 becomes a plurality of output light beams 31 after passing through the light guiding film 1. In this embodiment, the light guiding film 1 is attached to a glass (not shown) of a window of a room, the incident light beams 30 are the sunlight beams outside the room, and the output light beams enter the room. The microstructure 12 faces the incident light beams 30.

As shown in FIG. 2, an output angle $\theta_3$ is defined as the angle between the output light beam 31 and the light guiding film 1. The output angle $\theta_3$ is defined as 0 degrees when the output light beam (i.e., the output light beam 32) is downward and parallel with the light guiding film 1. The output angle $\theta_3$ is defined as 90 degrees when the output light beam (i.e., the output light beam 33) is horizontal and parallel with the reference plane 20. The output angle $\theta_3$ is defined as 180 degrees when the output light beam (i.e., the output light beam 34) is upward and parallel with the light guiding film 1.

An incident angle $\theta_4$ is defined as the angle between the incident light beam 30 and the reference plane 20. The incident angle $\theta_4$ is defined as positive when the incident light beam 30 is downward, the incident angle $\theta_4$ is defined as 0 degrees when the incident light beam (not shown) is horizontal and parallel with the reference plane 20, and the incident angle $\theta_4$ is defined as negative when the incident light beam (not shown) is upward.

As shown in FIG. 3, the incident light beams 30 enter the microstructure 12 through the second surface 122 of the microstructure 12 by refraction, and are reflected by the first surface 121 of the microstructure 12. Then, the reflected incident light beams 30 pass through the film base 11 to become the output light beams 31. It is to be noted that the incident light beams 30 are reflected by the first surface 121 due to the specific design of the first inclination angle $\theta_1$ and the second inclination angle $\theta_2$. Therefore, when the incident angle $\theta_4$ of the incident light beams 30 is in the range of 30 to 60 degrees downward, more than 50% of the output light beams 31 are upward. Further, the output light beams 31 will concentrate in a specific range of the output angle $\theta_3$, that is, the total luminous flux of the output light beams 31 with the specific range of the output angle is a peak when it is compared with other output light beams 31 with other range of output angle.

In this embodiment, the incident angles $\theta_4$ of the incident light beams 30 are from 30 to 60 degrees, and the total luminous flux of the output light beams 31 with the output angles from 85 to 120 degrees is more than 40% of the total luminous flux of the output light beams 31 with the output angles from 0 to 180 degrees.

Figure 5:
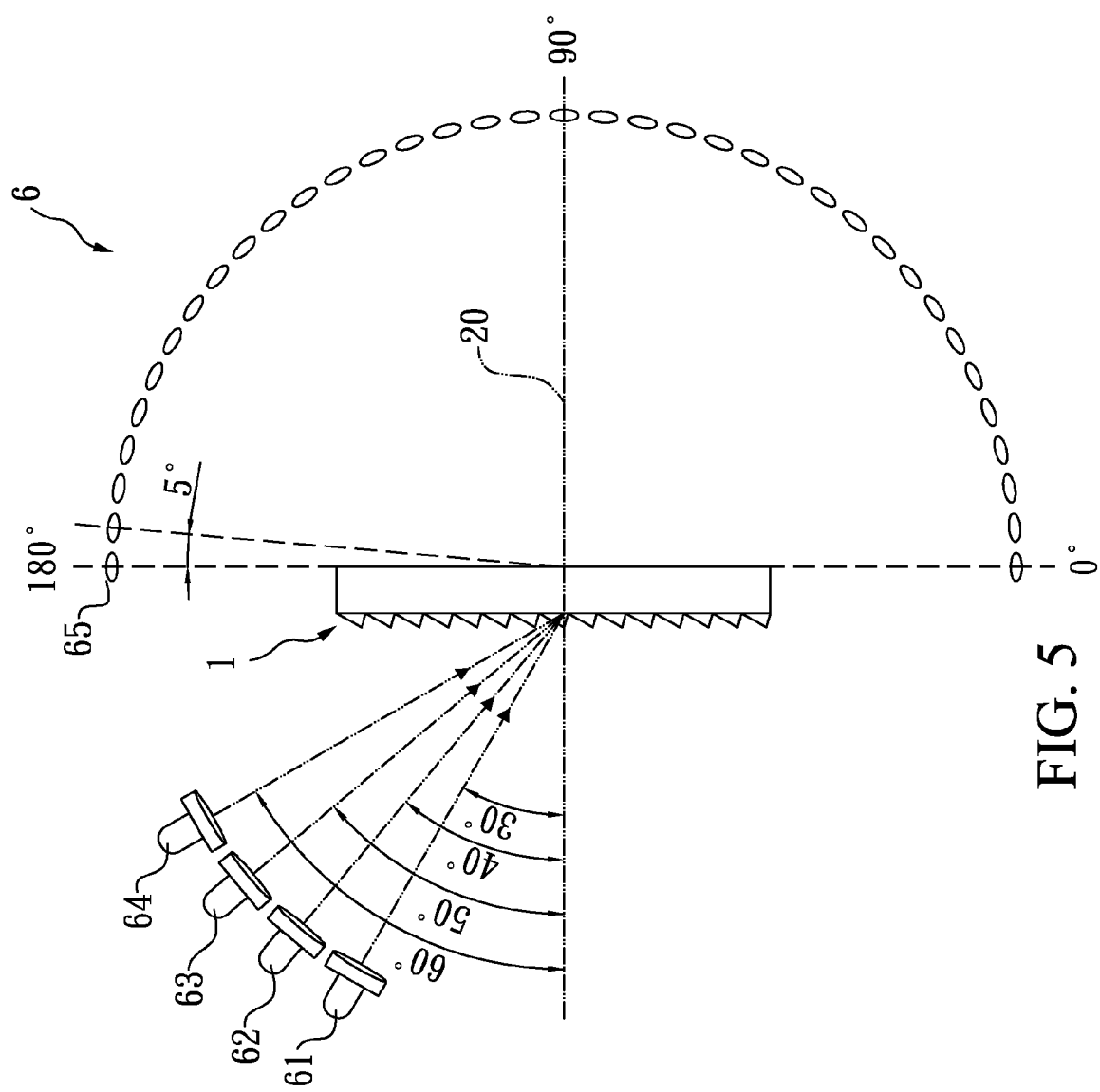
FIG. 5 is a schematic view of a testing apparatus for simulating the actual application of the light guiding film according to an embodiment of the present invention.

FIG. 5 shows a schematic view of a testing apparatus for simulating the actual application of the light guiding film according to an embodiment of the present invention. The testing apparatus 6 includes four light sources 61, 62, 63, 64 and thirty-seven receivers 65. The light guiding film 1 is disposed in the center of the testing apparatus 6, the light sources 61, 62, 63, 64 are disposed on the left side of the light guiding film 1, and the receivers 65 are disposed on the right side of the light guiding film 1. The receivers 65 surround the light guiding film 1 to form a semicircular appearance, and the intervals therebetween are equal, so that the receivers 65 can measure the luminous flux (for example, lumen) of the output light beams 31 every 5 degrees from 0 to 180 degrees.

The light source 61 is used for generating the incident light beam at 30 degrees, the light source 62 is used for generating the incident light beam at 40 degrees, the light source 63 is used for generating the incident light beam at 50 degrees, and the light source 64 is used for generating the incident light beam at 60 degrees. The light sources 61, 62, 63, 64 are turned on at the same time.

The simulation parameters are as follows. The refraction index of the film base 11 is 1.59. The size of the light guiding film 1 is 10*10 mm$^2$. The diameter of each of the light sources 61, 62, 63, 64 is 4 mm. The diameter of each of the receivers 65 is 13 mm. The distance between the light sources 61, 62, 63, 64 and the light guiding film 1 is 100 mm. The distance between the receivers 65 and the light guiding film 1 is 157 mm.

Table 1 below shows the simulation results of different types of the light guiding film 1, wherein n is the refraction index of the microstructure, and the result is the ratio of luminous flux. In the Table 1, the types of the light guiding film from left to right in sequence are first type (the first inclination angle $\theta_1$ is 15 degrees, the second inclination angle $\theta_2$ is 60 is degrees, and the refraction index of the microstructure 12 is 2.3), second type (the first inclination angle $\theta_1$ is 15 degrees, the second inclination angle $\theta_2$ is 52 degrees, and the refraction index of the microstructure 12 is 2.3), third type (the first inclination angle $\theta_1$ is 15 degrees, the second inclination angle $\theta_2$ is 66 degrees, and the refraction index of the microstructure 12 is 2.3), fourth type (the first inclination angle $\theta_1$ is 11 degrees, the second inclination angle $\theta_2$ is 60 degrees, and the refraction index of the microstructure 12 is 2.3), fifth type (the first inclination angle $\theta_1$ is 15 degrees, the second inclination angle $\theta_2$ is 68 degrees, and the refraction index of the microstructure 12 is 2.3), sixth type (the first inclination angle $\theta_1$ is 19 degrees, the second inclination angle $\theta_2$ is 60 degrees, and the refraction index of the microstructure 12 is 2.3), seventh type (the first inclination angle $\theta_1$ is 15 degrees, the second inclination angle $\theta_2$ is 60 degrees, and the refraction index of the microstructure 12 is 2.1) and eighth type (the first inclination angle $\theta_1$ is 15 degrees, the second inclination angle $\theta_2$ is 60 degrees, and the refraction index of the microstructure 12 is 2.6).

In Table 1, taking the leftmost first type for example, the ratio of luminous flux (64.9%) of the $\theta_t$ 0°~180° represents the ratio of the total luminous flux of the output light beams 31 measured by the receivers 65 from 0 to 180 degrees to the total luminous flux provided by the light sources 61, 62, 63, 64. The ratio of luminous flux (64.8%) of the $\theta_t$ 90°~180° represents the ratio of the total luminous flux of the output light beams 31 measured by the receivers 65 from 90 to 180 degrees to the total luminous flux provided by the light sources 61, 62, 63, 64. The ratio of luminous flux (20.6%) of the $\theta_t$ 90°~105° represents the ratio of the total luminous flux of the output light beams 31 measured by the receivers 65 from 90 to 105 degrees to the total luminous flux provided by the light sources 61, 62, 63, 64. The ratio of luminous flux (55.2%) of the $\theta_t$ 90°~120° represents the ratio of the total luminous flux of the output light beams 31 measured by the receivers 65 from 90 to 120 degrees to the total luminous flux provided by the light sources 61, 62, 63, 64. The ratio of luminous flux (55.2%) of the $\theta_t$ 85°~120° represents the ratio of the total luminous flux of the output light beams 31 measured by the receivers 65 from 85 to 120 degrees to the total luminous flux provided by the light sources 61, 62, 63, 64.

The ratio of luminous flux (99.8%) of the $\theta_t$ 90°~180°/$\theta_t$ 0°~180° represents the ratio of the luminous flux ratio (64.8%) of the $\theta_t$ 90°~180° to the luminous flux ratio (64.9%) of the $\theta_t$ 0°~180°. The ratio of luminous flux (31.8%) of the $\theta_t$ 90°~105°/$\theta_t$ 0°~180° represents the ratio of the luminous flux ratio (20.6%) of the $\theta_t$ 90°~105° to the luminous flux ratio (64.9%) of the $\theta_t$ 0°~180°. The ratio of luminous flux (85.0%) of the $\theta_t$ 90°~120°/$\theta_t$ 0°~180° represents the ratio of the luminous flux ratio (55.2%) of the $\theta_t$ 90°~120° to the luminous flux ratio (64.9%) of the $\theta_t$ 0°~180°. The ratio of luminous flux (85.0%) of the $\theta_t$ 85°~120°/$\theta_t$ 0°~180° represents the ratio of the luminous flux ratio (55.2%) of the $\theta_t$ 85°~120° to the luminous flux ratio (64.9%) of the $\theta_t$ 0°~180°.

TABLE 1 the simulation results of different types the light guiding film

| | | n = 2.3 | | | | | | n = 2.1 | n = 2.6 |
|---|---|---|---|---|---|---|---|---|---|
| | | Type | | | | | | | |
| Output angle | Range of output angle | First type $\theta_1$: 15° $\theta_2$: 60° | Second type $\theta_1$: 15° $\theta_2$: 52° | Third type $\theta_1$: 15° $\theta_2$: 66° | Fourth type $\theta_1$: 11° $\theta_2$: 60° | Fifth type $\theta_1$: 15° $\theta_2$: 68° | Sixth type $\theta_1$: 19° $\theta_2$: 60° | Seventh type $\theta_1$: 15° $\theta_2$: 60° | Eighth type $\theta_1$: 15° $\theta_2$: 60° |
| $\theta_t$ | 0°~180° | 64.9% | 60.3% | 51.4% | 59.1% | 56.4% | 59.7% | 59.0% | 55.8% |
| $\theta_t$ | 90°~180° | 64.8% | 39.0% | 47.1% | 54.8% | 43.9% | 53.1% | 58.9% | 54.9% |
| $\theta_t$ | 90°~105° | 20.6% | 20.8% | 11.3% | 28.0% | 13.8% | 5.1% | 22.0% | 20.3% |
| $\theta_t$ | 90°~120° | 55.2% | 37.5% | 25.6% | 45.5% | 16.8% | 17.0% | 56.6% | 36.0% |
| $\theta_t$ | 85°~120° | 55.2% | 46.0% | 26.4% | 45.5% | 16.8% | 17.0% | 56.6% | 36.0% |
| $\theta_t$ | 90°~180°/ 0°~180° | 99.8% | 64.7% | 91.6% | 92.9% | 77.7% | 88.9% | 99.8% | 98.3% |
| $\theta_t$ | 90°~105°/ 0°~180° | 31.8% | 34.5% | 22.0% | 47.4% | 24.5% | 8.6% | 37.2% | 36.3% |
| $\theta_t$ | 90°~120°/ 0°~180° | 85.0% | 62.1% | 49.8% | 77.1% | 29.7% | 28.4% | 95.8% | 64.5% |
| $\theta_t$ | 85°~120°/ 0°~180° | 85.0% | 76.3% | 51.3% | 77.1% | 29.7% | 28.4% | 95.8% | 64.5% |

As shown in Table 1, taking the first type as an example, because of the specific design of the first inclination angle $\theta_1$ (15 degrees), the second inclination angle $\theta_2$ (60 degrees) and the refraction index, the ratio of luminous flux of $\theta_t 85°~120°/\theta_t 0°~180°$ is 85.0%, which means 85.0% of the output light beams 31 are directed in the output angles from 85 to 120 degrees. In this embodiment, the light guiding film 1 is disposed on the relatively high window, i.e., air shutter, of the room. Such range of the output angles from 85 to 120 degrees is desired because the output light beams 31 with greater than 120 degrees will fall upon the ceiling near the window, and the output light beams 31 at less than 85 degrees will illuminate the human eye directly and cause glare. Therefore, the light guiding film 1 can guide the incident light beams 30 into the room nearly horizontally to avoid glare.

As shown in Table 1, although the ratios of luminous flux of the $\theta_t 85°~120°/\theta_t 0°~180°$ of the fifth type and the sixth type are 29.7% and 28.4%, respectively, the ratios of luminous flux of the $\theta_t 90°~180°/\theta_t 0°~180°$ of the fifth type and the sixth type are 77.7% and 88.9%, respectively. Therefore, the fifth type and the sixth type also have the effect of avoiding glare.

In addition, the sum of the value of the first inclination angle $\theta_1$ and the value of the second inclination angle $\theta_2$ is between 63 to 87 degrees; therefore, the light guiding film 1 is relatively simple to manufacture, and the transfer ratio of grooves is raised efficiently.

Figure 6:
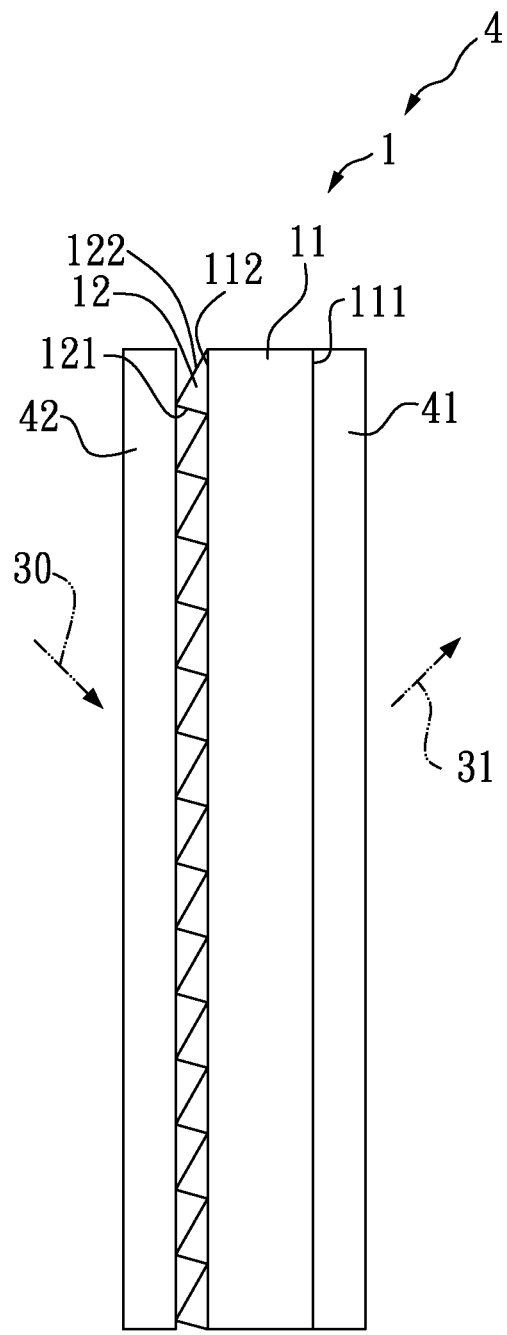
FIG. 6 is a side view of a window system according to an embodiment of the present invention.

FIG. 6 shows a side view of a window system according to an embodiment of the present invention. The window system 4 comprises a first plate 41, a first plate 42 and a light guiding film 1. The second plate 42 is fixed to the first plate 41 to form a closed space. The light guiding film 1 is the same as the light guiding film 1 of FIGS. 1 to 4, and is disposed in the accommodating space between the first plate 41 and the second plate 42. The light guiding film 1 comprises a film base 11 and at least one microstructure 12. The first plate 41, the second plate 42, the film base 11, and the microstructure 12 are light transmissible, and the second plate 42 faces the incident light beams 30. Preferably, the material of the first plate 41 and the second plate 42 is glass.

In this embodiment, the light guiding film 1 is attached to the first plate 41, the microstructure 12 is disposed on the second side 112 of the film base 11. The value of the first inclination angle $\theta_1$ is between 11 to 19 degrees, and the value of the second inclination angle $\theta_2$ is between 52 to 68 degrees, and the sum of the value of the first inclination angle $\theta_1$ and the value of the second inclination angle $\theta_2$ is between 63 to 87 degrees. Preferably, the value of the first inclination angle $\theta_1$ is between 13 to 17 degrees, and the value of the second inclination angle $\theta_2$ is between 58 to 66 degrees. More preferably, the first inclination angle $\theta_1$ is 15 degrees, and the second inclination angle $\theta_2$ is 60 degrees. The types of light guiding film 1 and description thereof are the same as or similar to the description stated above, and will not be repeated hereinafter.

While several embodiments of the present invention have been illustrated and described, various modifications and improvements can be made by those skilled in the art. The embodiments of the present invention are therefore described in an illustrative but not restrictive sense. It is intended that the present invention should not be limited to the particular forms as illustrated, and that all modifications which maintain the spirit and scope of the present invention are within the scope defined in the appended claims.

What is claimed is:

1. A light guiding film comprising:
   a film base, having a first side and a second side opposite the first side; and
   at least one microstructure, disposed on the second side of the film base, the refraction index of the at least one microstructure is 1.9 to 2.6, the at least one microstructure having a first surface and a second surface above the first surface, wherein a first inclination angle is between the first surface and a reference plane, the reference plane is perpendicular to the film base, a second inclination angle is between the second surface and the reference plane, wherein the value of the first inclination angle is less than or equal to the value of the second inclination angle,
   wherein the sum of the value of the first inclination angle and the value of the second inclination angle is between 63 to 87 degrees.

2. The light guiding film as claimed in claim 1, wherein the value of the first inclination angle is between 11 to 19 degrees, and the value of the second inclination angle is between 52 to 68 degrees.

3. The light guiding film as claimed in claim 1, wherein a plurality of incident light beams becomes a plurality of output light beams after passing through the light guiding film, an output angle is defined as the angle between the output light beam and the light guiding film, the output angle is defined as 0 degree when the output light beam is downward and parallel with the light guiding film, the output angle is defined as 180 degrees when the output light beam is upward and parallel with the light guiding film, the total energy of the output light beams with the output angles from 85 to 120 degrees is more than 40% of the total energy of the output light beams with the output angles from 0 to 180 degrees.

4. The light guiding film as claimed in claim 3, wherein the light guiding film is attached to a glass of a window of a room, the incident light beams are the sunlight beams outside the room, and the output light beams enter the room.

5. The light guiding film as claimed in claim 3, wherein an incident angle is defined as the angle between the incident light beam and the reference plane, the incident angle is defined as positive when the incident light beam is downward, the incident angles of the incident light beams are from 30 to 60 degrees.

6. The light guiding film as claimed in claim 3, wherein the microstructure faces the incident light beams.

7. The light guiding film as claimed in claim 1, wherein the material of the film base is different from that of the least one microstructure.

8. The light guiding film as claimed in claim 1, wherein the microstructure further comprises a curved chamfer, the curved chamfer is disposed between the first surface and the second surface, and adjacent to the first surface and the second surface.

9. A window system comprising:
a first plate;
a second plate, fixed to the first plate; and
a light guiding film, disposed in an accommodating space between the first plate and the second plate, and comprising:
a film base, having a first side and a second side opposite the first side; and
at least one microstructure, disposed on the second side of the film base, the refraction index of the at least one microstructure is 1.9 to 2.6, the at least one microstructure having a first surface and a second surface above the first surface, wherein a first inclination angle is between the first surface and a reference plane, the reference plane is perpendicular to the film base, a second inclination angle is between the second surface and the reference plane, wherein the value of the first inclination angle is less than or equal to the value of the second inclination angle,
wherein the sum of the value of the first inclination angle and the value of the second inclination angle is between 63 to 87 degrees.

10. The window system as claimed in claim 9, wherein the value of the first inclination angle is between 13 to 17 degrees, and the value of the second inclination angle is between 58 to 66 degrees.

11. The window system as claimed in claim 9, wherein the first plate, the second plate, the film base, and the microstructure are light transmissible.

12. The window system as claimed in claim 9, wherein the material of the first plate and the second plate is glass.

13. The window system as claimed in claim 9, wherein a plurality of incident light beams becomes a plurality of output light beams after passing through the light guiding film, an output angle is defined as the angle between the output light beam and the light guiding film, the output angle is defined as 0 degrees when the output light beam is downward and parallel with the light guiding film, the output angle is defined as 180 degrees when the output light beam is upward and parallel with the light guiding film, the total energy of the output light beams with the output angles from 85 to 120 degrees is more than 40% of the total energy of the output light beams with the output angles from 0 to 180 degrees, and the light guiding film is attached to the first plate.

14. The window system as claimed in claim 13, wherein the incident light beams are the sunlight beams outside a room, the second plate faces incident light beams, and the output light beams enter the room.

* * * * *